(12) United States Patent
Hummel et al.

(10) Patent No.: US 9,676,273 B2
(45) Date of Patent: Jun. 13, 2017

(54) STRAP ADJUSTMENT MECHANISM

(71) Applicant: Cummins Emission Solutions, Inc., Columbus, IN (US)

(72) Inventors: Ken Hummel, Barneveld, WI (US); Raghunath Thakar, Madison, WI (US); Scott Ehlenfeldt, Beaver Dam, WI (US)

(73) Assignee: Cummins Emission Solutions, Inc., Columbus, IN (US)

( * ) Notice: Subject to any disclaimer, the term of this patent is extended or adjusted under 35 U.S.C. 154(b) by 133 days.

(21) Appl. No.: 14/495,661

(22) Filed: Sep. 24, 2014

(65) Prior Publication Data
US 2016/0082829 A1   Mar. 24, 2016

(51) Int. Cl.
*A47F 5/00* (2006.01)
*B60K 13/04* (2006.01)
*F16B 2/08* (2006.01)

(52) U.S. Cl.
CPC .............. *B60K 13/04* (2013.01); *F16B 2/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,074,523 A | * | 3/1937 | Thwaits | ............ B60P 3/22 220/DIG. 24 |
| 2,090,059 A | * | 8/1937 | McClane | ............ B64D 37/04 220/562 |
| 2,368,929 A | * | 2/1945 | King | ............ F16L 33/04 24/279 |
| 2,622,887 A | * | 12/1952 | Prior | ............ B60K 15/00 220/23.2 |
| 3,006,443 A | | 10/1961 | Siler | |
| 3,306,121 A | | 2/1967 | Jenkins | |
| 3,430,507 A | | 3/1969 | Hurst et al. | |
| 3,824,808 A | | 7/1974 | Mangiavacchi | |

(Continued)

FOREIGN PATENT DOCUMENTS

GB    842400    7/1960

OTHER PUBLICATIONS

Foley Universal Governor, Foley Industrial Engines, http://www.foleyengines.com/sites/default/files/GovernorDocumentation3.pdf, Worcester, MA. Jan. 24, 2014, pp. 1-8.

*Primary Examiner* — Monica Millner
(74) *Attorney, Agent, or Firm* — Foley & Lardner LLP

(57) ABSTRACT

A strap adjustment mechanism may include a pin with a pin opening that is insertable into a looped portion of an end of a strap. The strap adjustment mechanism may also include a fastener support assembly that has a first member and a second member. The second member is configured to translate along a central axis relative to the first member in response to rotation of the first member. The first member includes a first opening substantially collinear with the central axis of the second member, and the second member includes a second opening substantially collinear with the central axis of the second member. The strap adjustment mechanism further includes a strap attachment member that is insertable through the first and second openings of the first member and the second member. The strap attachment member is configured to engagably couple to the pin via the pin opening.

18 Claims, 5 Drawing Sheets

(56) References Cited

U.S. PATENT DOCUMENTS

| | | | |
|---|---|---|---|
| 3,894,707 A * | 7/1975 | Heard | F16B 2/08 |
| | | | 248/225.11 |
| 3,922,927 A | 12/1975 | Hibino et al. | |
| 4,023,428 A | 5/1977 | Dysard | |
| 4,583,961 A | 4/1986 | Kawasawa et al. | |
| 4,610,453 A * | 9/1986 | Collier | B60K 15/067 |
| | | | 180/68.5 |
| 4,912,813 A | 4/1990 | Muller et al. | |
| 6,059,252 A * | 5/2000 | Emmann | B60K 15/067 |
| | | | 248/503 |
| 6,101,903 A * | 8/2000 | Negley | B25B 13/52 |
| | | | 81/3.43 |
| 6,402,198 B2 * | 6/2002 | Gollungberg | B60P 3/22 |
| | | | 280/830 |
| 6,638,191 B1 | 10/2003 | Hankins et al. | |
| 7,448,973 B2 | 11/2008 | Simmons | |
| 7,887,248 B2 | 2/2011 | Heath | |
| 8,104,709 B2 | 1/2012 | Manz | |
| 8,555,753 B2 | 10/2013 | Price | |

* cited by examiner

STRAP ADJUSTMENT MECHANISM

TECHNICAL FIELD

The present application relates generally to the field of attachment mechanisms for exhaust systems. More specifically, the present application relates to a strap adjustment mechanism for securing components of an exhaust system.

BACKGROUND

Combustion engines may include exhaust systems to direct and, in some instances, treat exhaust gases emitted from the combustion engine. For instance, diesel engines may include exhaust system components to treat nitrogen oxide ($NO_x$) compounds that may be emitted in the exhaust gas from the diesel engine. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. A SCR catalyst may be included in a catalyst chamber of an exhaust system, such as that of a vehicle or power generation unit. The exhaust system may include other components for the exhaust system, such as a diesel particulate filter (DPF), a diesel oxidation catalyst (DOC), or other components. The components for the exhaust system and/or other components are typically mounted to a vehicle chassis or power generation frame at fixed, predetermined positions. In some instances the components may need to be removed, such as for servicing and/or replacement.

SUMMARY

Implementations described herein relate to a strap adjustment mechanism that can accommodate large tolerance ranges, such as those that may exist for high horsepower aftertreatment system components. That is, as some combustion engines increase in size, the exhaust system components, such as aftertreatment components, may also increase in size. Such large components may have large tolerance ranges, which results in varying sizes for the aftertreatment components. Accordingly, to secure such components the straps or other mounting mechanism may need to be sized for each particular component based on the variable size and/or the mounting mechanisms can be configured to be adjustable to accommodate the varying sizes.

One implementation relates to a mounting system that includes a mounting bracket, a strap, a pin, a fastener support assembly and a strap attachment member. The mounting bracket includes an attachment opening and the strap includes an end. The pin has a pin opening and is insertable into a looped portion of the end of the strap. The fastener support assembly includes a first member and a second member. The second member is configured to translate along a central axis of the second member relative to the first member and responsive to rotation of the first member. The first member includes a first opening substantially collinear with the central axis of the second member, and the second member includes a second opening substantially collinear with the central axis of the second member. The strap attachment member is insertable through the attachment opening, the first opening of the first member, and second opening and the second member and is configured to engagably couple to the pin via the pin opening.

Another implementation relates to a strap adjustment mechanism that includes a pin, a fastener support assembly and a strap attachment member. The pin includes a pin opening and is insertable into a looped portion of an end of a strap. The fastener support assembly includes a first member and a second member. The second member is configured to translate along a central axis of the second member relative to the first member and responsive to rotation of the first member. The first member includes a first opening substantially collinear with the central axis of the second member, and the second member includes a second opening substantially collinear with the central axis of the second member. The strap attachment member is insertable through the first and second openings of the first member and the second member and is configured to engagably couple to the pin via the pin opening.

Yet a further implementation relates to a process for securing an exhaust system component to a mounting system. The process includes inserting a strap attachment member through an attachment opening of a mounting bracket of the mounting system and an opening through a fastener support assembly. The process also includes engagably coupling the strap attachment member to a pin inserted through a looped portion of an end of a strap of the mounting bracket. The process further includes tightening the strap attachment member relative to the pin and engaging a second member of the fastener support assembly to cooperatively secure the end of the strap with the pin by rotating a first member of the fastener support assembly.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
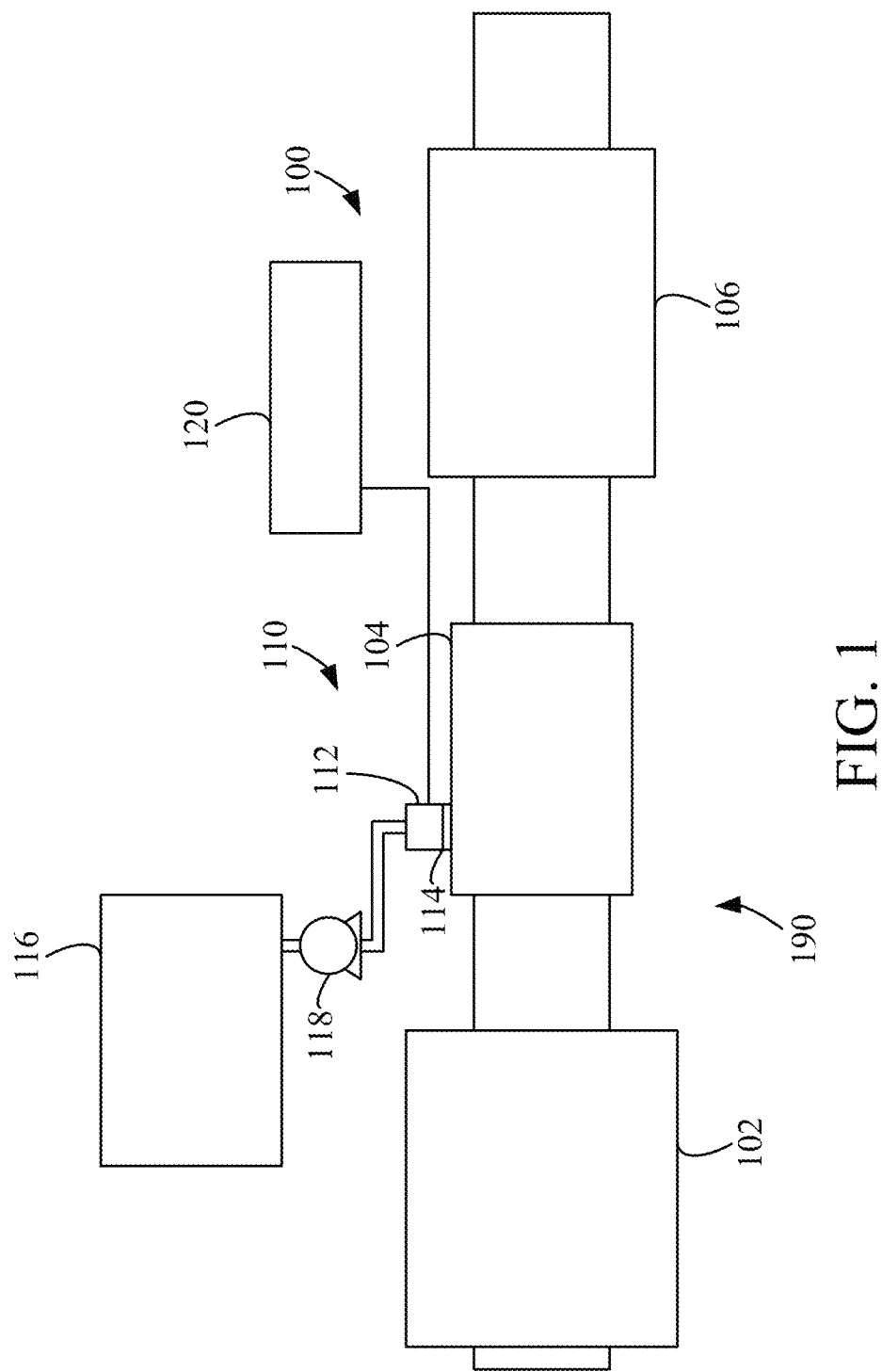
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for a strap adjustment mechanism for securing components of an exhaust system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Exhaust systems, such as those for vehicles, power generation units, and/or other implementations having an internal combustion engine, are typically predetermined based on the design of the vehicle, power generation unit, and/or other implementation in which the exhaust system is to be utilized. The components of the exhaust system, which may include aftertreatment components, may typically have mounting systems and/or brackets to mount or secure the exhaust system components at locations and/or configurations of a vehicle chassis, a power generation unit frame, and/or other frame. Such mounting systems and/or brackets may utilize straps or other features for securing the exhaust system component to the bracket and/or mounting system. The straps or other features attach to the bracket and/or mounting system to secure the component thereto. In some implementations, the straps or other features are coupled to the bracket and/or mounting system via a fastener, such as a bolt, screw, clamp, clip, crank, etc. In some instances, the exhaust system components for high horsepower aftertreatment system components may be large components that may have large tolerance ranges, which can result in varying sizes for the aftertreatment components. To secure such components the straps or other mounting mechanism may need to be sized for each particular component based on the variable size and/or the mounting mechanisms can be configured to be adjustable to accommodate the varying sizes.

In some implementations, a fastener support assembly may be utilized to secure the component via the strap and/or other feature and may be adjustable to loosen or tighten the strap and/or other feature to secure the exhaust system component. Such a fastener support assembly may be a bolt support assembly that includes a bolt support assembly nut and a top support block that has a saddle for engaging with a pin for the strap and/or other feature. The pin may be inserted through an end loop of the strap and include an opening with threading for engaging with threads of a bolt. In some implementations, the bolt support assembly that be positioned between a mounting bracket and the end of the strap to loosen or tighten the strap via rotation of the bolt support assembly nut to actuate the top support block relative to the mounting bracket. The bolt support assembly may include a through opening through which a bolt may be inserted to engage with threading of the opening through the pin. The bolt may be inserted through an opening in the mounting bracket and the through opening of the bolt support assembly to initially engage with the threading of the pin in the end loop of the strap to initially secure the strap to the mounting bracket. The bolt support assembly may be adjusted to engage the pin and strap with the saddle of the top support block to further secure the strap and exhaust component to the exhaust system. The bolt and bolt support assembly may further be torqued to a predetermined torque level to cooperatively secure the exhaust system component via the strap.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the urea, aqueous ammonia, or DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NO emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

III. Implementation of an Adjustable Strap Mechanism for a Mounting System

Figure 2:
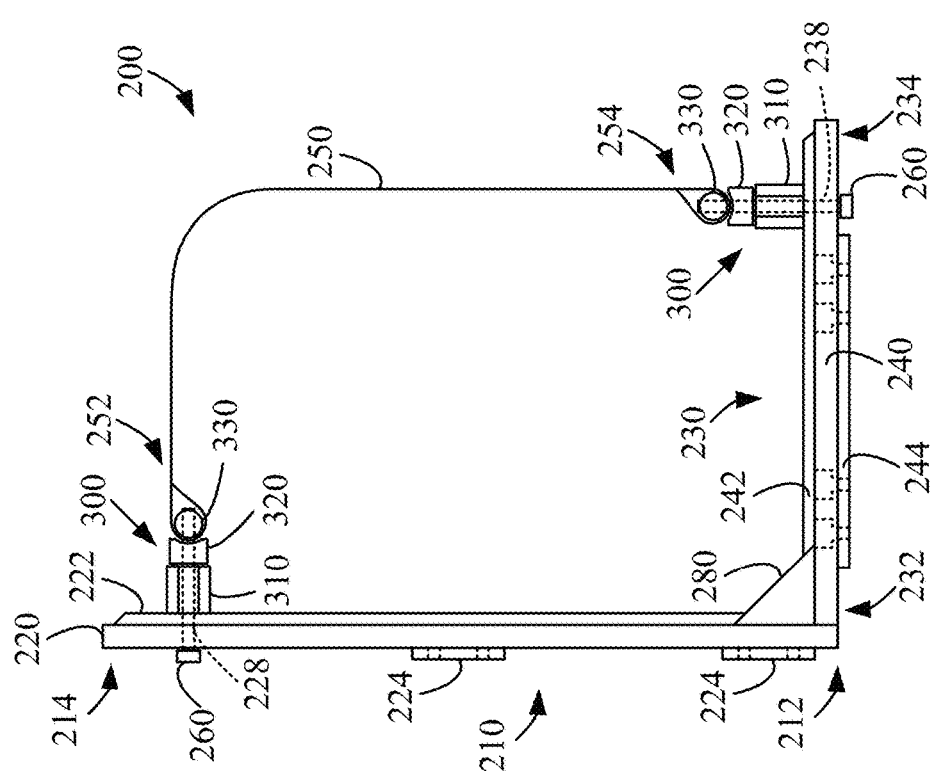
FIG. 2 is a side elevation view of an implementation of a mounting bracket for mounting system having an implementation of a strap adjustment mechanism.
Figure 3:
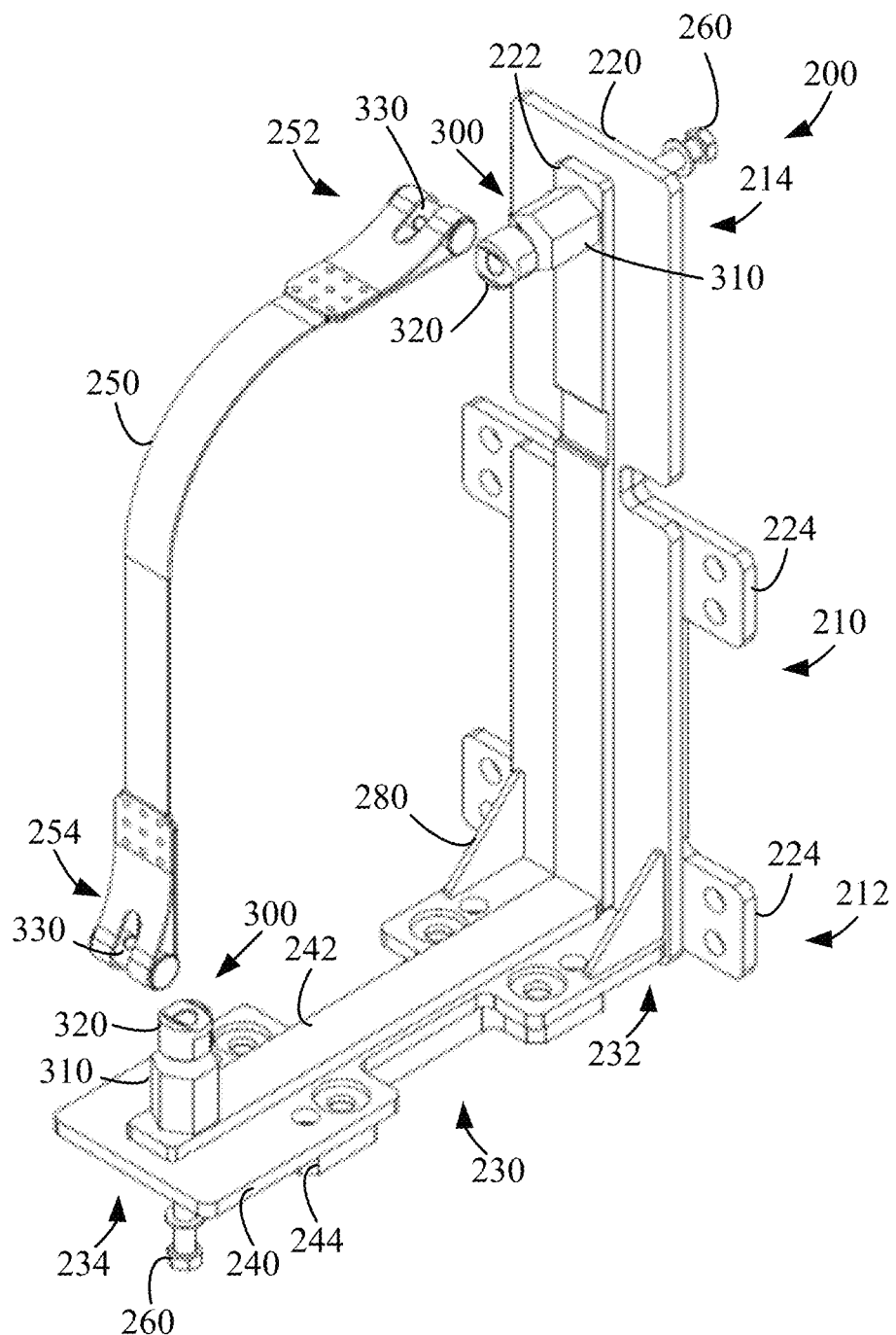
FIG. 3 is a perspective view of the implementation of the mounting bracket of FIG. 2 having the implementation of the strap adjustment mechanism.

FIGS. 2-3 depict an implementation of a mounting bracket 200 for a mounting system. The mounting bracket 200 includes a first vertical member 210 and a second horizontal member 230. The first vertical member 210 and the second horizontal member 230 are attached at a first end 212 of the first vertical member 210 and a first end 232 of the second horizontal member 230. In some implementations, the first end 212 of the first vertical member 210 and the first end 232 of the second horizontal member 230 may be welded together. In other implementations, the first vertical member 210 and the second horizontal member 230 may be of unitary construction such that the first vertical member 210 and the second horizontal member 230 form a single homogeneous continuum of material that is bent at the first end 212 of the first vertical member 210 and the first end 232 of the second horizontal member 230. In the implementation shown, the first end 212 of the first vertical member 210 and the first end 232 of the second horizontal member 230 form a substantially 90 degree angle relative to each other. In other implementations, the first end 212 of the first vertical member 210 and the first end 232 of the second horizontal member 230 may form an angle less than 90 degrees or greater than 90 degrees (e.g., between approximately 0 degrees, inclusive, and approximately 180 degrees, inclusive, such as 45 degrees, 60 degrees, 120 degrees, 135 degrees, etc.). In some implementations, an angled member 280 may be included where the first end 212 of the first vertical member 210 and the first end 232 of the second horizontal member 230 are joined and/or meet.

The first vertical member 210 includes a main member 220, a mounting pad 222, and a pair of vertical attachment plates 224. The main member 220 may be the portion of the first vertical member 210 that is welded and/or is unitary with the second horizontal member 230. The main member 220 may be constructed of a metal material such as steel or aluminum, a composite material, and/or other suitable material.

Attached to the main member 220 is the mounting pad 222. The mounting pad 222 may be an elongate strip of material having a width that is smaller than the main member 220 and is configured to have the component that is secured to the mounting bracket 200 abut the mounting pad 222. In some implementations, the mounting pad 222 may be approximately 15 millimeters thick. The mounting pad 222 may be constructed of a metal material, such as steel or aluminum, a composite material, and/or other suitable material. The mounting pad 222 may be welded to the main member 220 along the edges of the mounting pad 222. The mounting pad 222 and the main member 220 include a first attachment opening 228 (e.g., a hole) into which a strap attachment member 260, such as bolt, may be inserted. In some implementations, the first attachment opening 228 may permit the strap attachment member 260 to pass through the first attachment opening 228 to be secured to another object, such as a nut, a threaded plate, a pin, and/or a portion of a chassis or frame. In some implementations, the strap attachment member 260 may engage with a pin 330 inserted through a first end 252 of an attachment strap 250. A fastener support assembly, such as a bolt support assembly 300, may be provided to permit adjustability in securing the strap to the mounting bracket 200, as will be described in greater detail below.

Also attached to the main member 220 is a pair of vertical attachment plates 224. The vertical attachment plates 224 are affixed to a back surface of the main member 220 and extend outwardly from both sides of the main member 220 (shown best in FIG. 4). The vertical attachment plates 224 each include one or more features, such as openings (e.g., holes) through which a surface attachment member, such as a bolt, a screw, etc., may be inserted and/or applied to, such as a clamp, a crank, etc., to attach the vertical attachment plate 224 to another surface or object, such as a chassis or frame. In the implementation shown herein, each vertical attachment plate 224 has four attachment openings, with two attachment openings on one side and another two attachment openings on the other side (shown best in FIG. 3). In some implementations, a first vertical attachment plate 224 may be coupled to the main member 220 substantially near the first end 212 of the first vertical member 210 and a second vertical attachment plate 224 may be coupled to the main member 220 substantially near a midpoint of the main member 220. In other implementations, the vertical attachment plates 224 may be coupled to the main member 220 at any position along the main member 220. The vertical attachment plates 224 may be welded to the main member 220 to affix the vertical attachment plates 224 to the main member 220. In other implementations, the vertical attachment plates 224 may be of unitary construction with the main member 220.

The second horizontal member 230 includes a main member 240, a mounting pad 242, and a horizontal attachment plate 244. The main member 240 may be the portion of the second horizontal member 230 that is welded and/or unitary with the first vertical member 210. The main member 240 may be constructed of a metal material, such as steel or aluminum, a composite material, and/or other suitable material.

Attached to the main member 240 is a mounting pad 242. The mounting pad 242 may be an elongate strip of material having a width that is smaller than the main member 240 and is configured to have the component that is secured to the mounting bracket 200 abut the mounting pad 242. In some implementations, the mounting pad 242 may be approximately 15 millimeters thick. The mounting pad 242 may be constructed of a metal material, such as steel or aluminum, a composite material, and/or other suitable material. The mounting pad 242 may be welded to the main member 240 along the edges of the mounting pad 242. The mounting pad 242 and the main member 240 include a second attachment opening 238 (e.g., a hole) into which a strap attachment member 260, such as a bolt, may be inserted. In some implementations, the second attachment opening 238 may permit the strap attachment member 260 to pass through the second attachment opening 238 to be secured to another object, such as a nut, a threaded plate, a pin, and/or a portion of a chassis or frame. In some implementations, the strap attachment member 260 may engage with a pin 330 inserted through a second end 254 of an attachment strap 250. A fastener support assembly, such as a bolt support assembly 300, may be provided to permit adjustability in securing the strap to the mounting bracket 200, as will be described in greater detail below.

Also attached to the main member 240 is a horizontal attachment plate 244. The horizontal attachment plate 244 is affixed to a bottom surface of the main member 240 and extends outwardly from both sides of the main member 240

(shown best in FIG. 3). The horizontal attachment plate 244 includes one or more features, such as openings (e.g., holes) through which a surface attachment member, such as a bolt, a screw, etc., may be inserted and/or applied to, such as a clamp, a crank, etc., to attach the horizontal attachment plate 244 to another surface or object, such as a chassis or frame. In the implementation shown herein, the horizontal attachment plate 244 has two sets of four attachment openings with two attachment openings on one side and another two attachment openings on the other side (shown best in FIG. 3). In some implementations, the main member 240 may also include countersunk openings for the surface attachment members (e.g., to receive the head of a surface attachment bolt). In some implementations, the horizontal attachment plate 244 may be coupled to the main member 240 substantially near a midpoint of the main member 240. In other implementations, the horizontal attachment plate 244 may be coupled to the main member 240 at any position along the main member 240. The horizontal attachment plate 244 may be welded to the main member 240 to affix the horizontal attachment plate 244 to the main member 240. In other implementations, the horizontal attachment plate 244 may be of unitary construction with the main member 240.

The attachment strap 250 is used to secure a component, such as an aftertreatment component and/or exhaust component, to the mounting bracket 200. The attachment strap 250 includes a first end 252 and a second end 254. The first and second ends 252, 254 have a looped portion that receives a pin 330 that engages with threads of a strap attachment member 260, such as a bolt to be secured to the mounting bracket 200 via the first and second attachment openings 228, 238. The looped portion of the first and second ends 252, 254 includes an opening through which a portion of the strap attachment member 260 may be inserted to engage with the pin 330. The attachment strap 250 may be a metal strap in some implementations.

Figure 4:
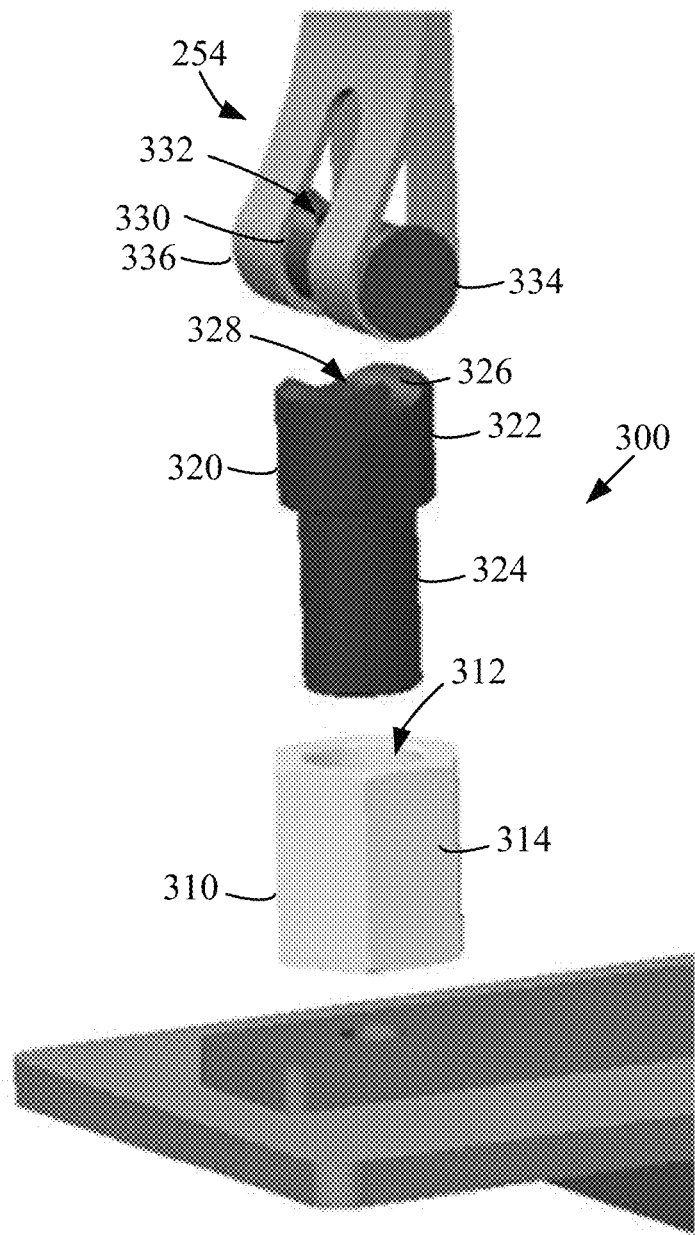
FIG. 4 is a magnified view of the strap adjustment mechanism of FIG. 3.

FIG. 4 depicts an enlarged and exploded view of the bolt support assembly 300, the pin 330, and the looped portion of one of the first and second ends 252, 254 of the attachment strap 250. The pin 330 inserted through the looped portion of the first end 252 and/or the second end 254 may be a cylindrical member having a threaded opening 332 into or through the cylindrical member to threadedly engage with the strap attachment member 260, such as via engaging with threads of a bolt. The pin 330 has ends 334, 336 against which the first end 252 or second end 254 is secured when a force is applied to the pin 330 opposite the attachment strap 250, such as when the strap attachment member 260 engages with the pin 330. In some implementations, the pin 330 may be integrated into the first end 252 and/or second end 254, such as via welding, unitary formation, etc.

The attachment support assembly, such as the bolt support assembly 300, includes a first member 310 and a second member 320. The first member 310 includes a first opening that may be substantially collinear with a central axis of the second member 320. The first member 310 may be a bolt support assembly nut having a threaded opening 312 into which a portion of the second member 320 may be threaded. The threaded opening 312 may be sized such that a portion of the strap attachment member 260, such as a threaded portion of a bolt, may extend through the first member 310 when the second member 320 is threaded into the threaded opening 312 of the first member 310. The first member 310 may further include exterior features 314, such as flat portions, to which a tool, such as a wrench, may be applied to rotate and/or torque the first member 310.

The second member 320 includes a second opening substantially collinear with the central axis of the second member 320. In some implementations, the second member 320 may be a top support block having a support portion 322 and a first member engagement portion 324. The support portion 322 includes a saddle 326, such as an arcuate portion curved to substantially conform to a portion of the curvature of the pin 330 and/or an end 252, 254 of the attachment strap 250. The first member engagement portion 324 includes a threaded exterior configured to engage with the threaded opening 312 of the first member 310. Thus, the first member engagement portion 324 may thread into a portion of the first member 310. Accordingly, when the first member 310 is rotated in a first direction relative to the second member 320, the threaded interior of the threaded opening 312 of the first member 310 engages with the threads of the threaded exterior of the first member engagement portion 324 of the second member 320 and the support portion 322 of the second member 320 is advanced away from the first member 310. Similarly, when the first member 310 is rotated in a second direction, opposite the first direction, relative to the second member 320, the threaded interior of the threaded opening 312 of the first member 310 engages with the threads of the threaded exterior of the first member engagement portion 324 of the second member 320 and the support portion 322 of the second member 320 is advanced toward the first member 310. Thus, rotation of the first member 310 moves the second member 320 relative to the first member 310. The second member 320 also includes a through opening 328 sized to permit a portion of the strap attachment member 260 through the second member 320.

When the strap attachment member 260 is engaged with the pin 330, such as threading a bolt into a threaded opening of the pin 330, the rotation of the first member 310 in the first direction relative to second member 320 can cause the support portion 322 of the second member 320 to compress against the looped portion of the first end 252 or second end 254 of the attachment strap 250 and the corresponding pin 330, thereby further securing the attachment strap 250 and applying a further load to the interface of the strap attachment member 260 and the pin 330. Similarly, the rotation of the first member 310 in the second direction relative to second member 320 can cause the support portion 322 of the second member 320 to loosen relative to the looped portion of the first end 252 or second end 254 of the attachment strap 250 and the corresponding pin 330, thereby loosening the attachment strap 250 and reducing the load to the interface of the strap attachment member 260 and the pin 330.

Figure 5:
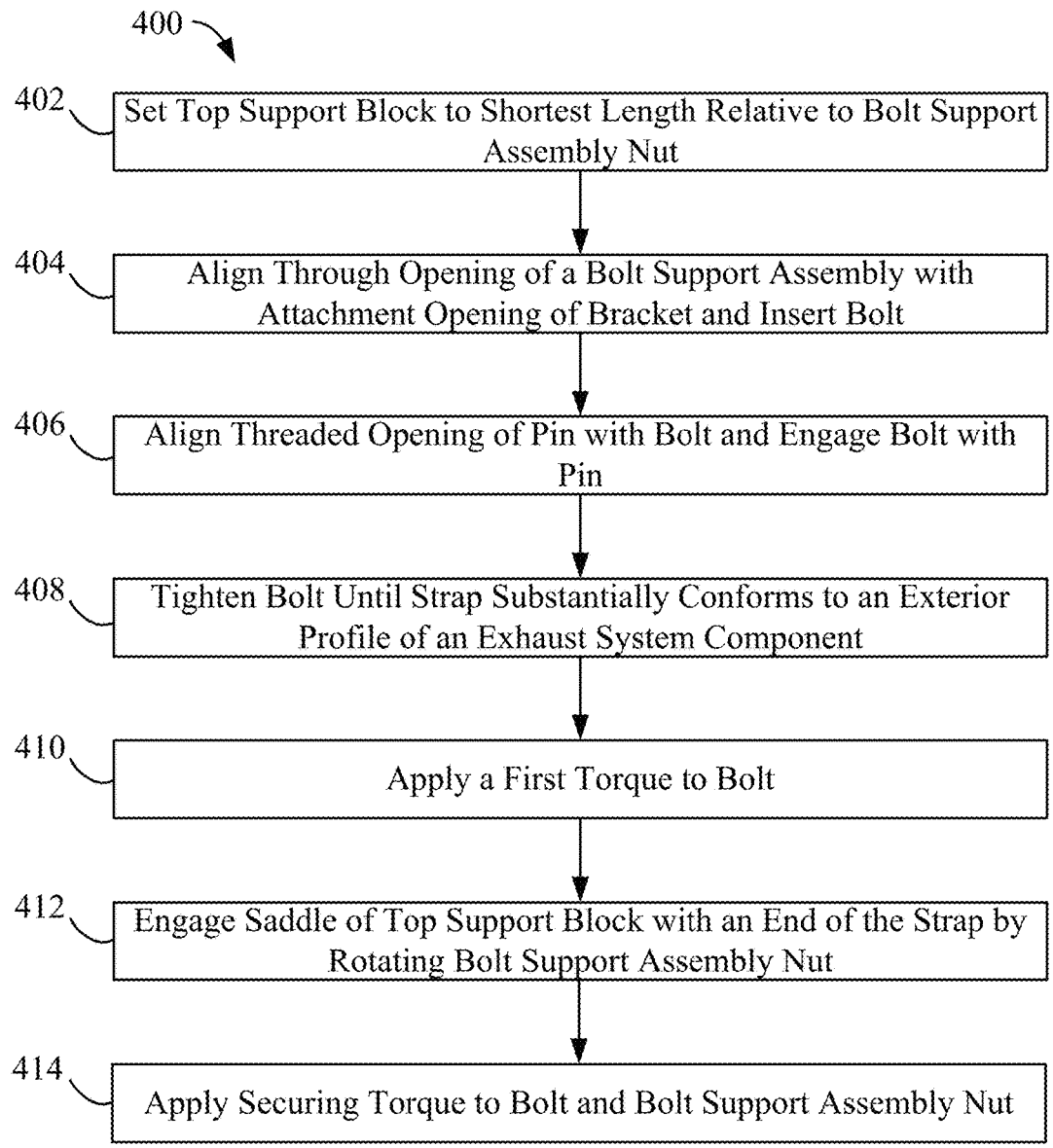
FIG. 5 is a flow diagram of an implementation of a process for securing an exhaust system component using the strap adjustment mechanism.

FIG. 5 depicts an implementation of a process 400 for securing an exhaust component to a mounting system utilizing an implementation of the adjustable strap mechanism described herein. The process 400 may include setting a top support block, such as the second member 320, to a shortest length relative to a bolt support assembly nut, such as first member 310 (block 402). Setting the top support block to a shortest length relative to the bolt support assembly nut may include threading a portion of the top support block, such as the first member engagement portion 324, into a threaded opening of the bolt support assembly nut to reduce the distance between a support portion of the top support block and the bolt support assembly nut to a minimum.

The process 400 further includes aligning a through opening of the bolt support assembly 300, such as the through opening 328 of the second member 320, with an attachment opening of a bracket, such as first attachment opening 228 or second attachment opening 238, and inserting a strap attachment member 260, such as a bolt (block 404). The through opening 328 of the second member 320 of the bolt support assembly 300 and the first attachment opening 228 or second attachment opening 238 of the mounting bracket 200 may be aligned to be substantially collinear and the strap attachment member 260, such as a bolt, is inserted through the first attachment opening 228 or second attachment opening 238 and the through opening 328 of the second member 320 such that a head of the bolt abuts the mounting bracket and a threaded portion of the bolt extends past the support portion 322 of the second member 320.

The process 400 includes aligning a threaded opening 332 of the pin 330 with the strap attachment member 260, such as a bolt, and engaging the strap attachment member 260 with the threaded opening 332 of the pin 330 (block 406). The bolt may be engagably coupled to the pin by being threaded into the threaded opening 332 of the pin 330 while ensuring that rotation of the bolt relative to the attachment strap 250 does not apply a torque on the attachment strap 250 that results in warping of the attachment strap 250 and/or twisting of the attachment strap 250 relative to the exhaust system component to be secured.

In some implementations, the setting of the top support block to a shortest length relative to the bolt support assembly nut (block 402), aligning of the through opening of the bolt support assembly with an attachment opening of a bracket and insertion of a bolt (block 404), and aligning of the threaded opening of the pin with a bolt and engaging of the bolt with the pin (block 406) may be repeated for each end 252, 254 of each attachment strap 250 to secure the exhaust system component to one or more mounting brackets 200.

The process 400 also includes tightening the strap attachment member 260 until the attachment strap 250 substantially conforms to an exterior profile of the exhaust system component to be secured (block 408). The strap attachment member 260, such as a bolt, can be tightened until the attachment strap 250 compresses against the exhaust system component and begins to secure the exhaust system component. For instance, for an SCR catalyst, the attachment strap 250 may compress against the exterior of the SCR catalyst and resiliently deform about the curvature or exterior profile of the SCR catalyst as one or more bolts are tightened by engaging and threading into the threaded opening 332 of the pin 330. In some implementations, the strap attachment member 260 may be tightened relative to the pin 330 until there is a small gap, such as between 1 millimeter, inclusive and 10 millimeters, inclusive, between the saddle 326 of the second member 320 and the corresponding end 252, 254 of the attachment strap 250. The tightening the strap attachment member 260 until the attachment strap 250 substantially conforms to an exterior profile of the exhaust system component to be secured (block 408) may be repeated for each strap attachment member 260 for each end 252, 254 of each attachment strap 250 to secure the exhaust system component to one or more mounting brackets 200.

The process 400 includes applying a first torque to the strap attachment member 260, such as a bolt (block 410). The first torque applied to the strap attachment member 260 may be. In some implementations, the first torque may be applied to a bolt securing one end 252, 254 of the attachment strap 250 while ensuring that there is still a small gap, such as 1 millimeter, inclusive, to 5 millimeters, inclusive, between the saddle 326 of the second member 320 and the corresponding end 252, 254 of the attachment strap 250. The first torque may also be applied to a bolt securing the other end 252, 254 of the attachment strap 250 while ensuring that there is still a small gap, such as 1 millimeter, inclusive, to 5 millimeters, inclusive, between the other saddle 326 of another second member 320 and the corresponding end 252, 254 of the attachment strap 250. The application of the first torque to the strap attachment member 260 (block 410) may be repeated for each bolt support assembly 300 for each end 252, 254 of each attachment strap 250 to secure the exhaust system component to one or more mounting brackets 200.

The process 400 also includes engaging the saddle 326 of the second member 320, such as a top support block, with the corresponding end 252, 254 of the attachment strap 250 by rotating the first member 310, such as a bolt support assembly nut (block 412). That is, the first member 310 may be rotated relative to the second member 320 such that the threads of the threaded opening 312 of the first member 310 engage with the threads of the threaded exterior of the first member engagement portion 324 of the second member 320 and the support portion 322 of the second member 320 is advanced away from the first member 310. Thus, the saddle 326 of the support portion 322 secures the corresponding end 252, 254 of the attachment strap 250 between the saddle 326 and the pin 330. In some implementations, engaging the saddle 326 of the second member 320 with the corresponding end 252, 254 of the attachment strap 250 by rotating the first member 310 (block 412) may be repeated for each bolt support assembly 300 for each end 252, 254 of each attachment strap 250 to secure the exhaust system component to one or more mounting brackets 200.

The process 400 further includes applying a securing torque to the strap attachment member 260, such as a bolt, and to the first member 310, such as a bolt support assembly nut (block 414). Applying the securing torque may include applying a small torque to the first member 310 for each bolt support assembly 300 to further engage the saddle 326 of the first member 320 with the corresponding end 252, 254 of the attachment strap 250 without twisting or substantially rotationally deforming the attachment strap 250. The application of the securing torque may also include applying a small torque to the strap attachment member 260, such as a bolt, to further apply a load to the interface of the strap attachment member 260 and the threaded opening 332 of the pin 330, such as applying a further load to the threads of the bolt and the threads of the threaded opening 332. The application of a securing torque to the strap attachment member 260 and to the first member 310 (block 414) may be repeated for each bolt support assembly 300 for each end 252, 254 of each attachment strap 250 to secure the exhaust system component to one or more mounting brackets 200.

To release the exhaust component from a mounting system having an adjustable strap mechanism described herein, the reverse of process 400 may be performed.

In some instances, fatigue or wear may result in slackening of one or more of the attachment strap 250, the interface of the strap attachment member 260 and the pin 330, the first member 310 of the bolt support assembly 300 relative to the second member 320, etc. Accordingly, the bolt support assembly 300 may be utilized to retighten and further secure the exhaust system component to the mounting bracket 200. To do so, the saddle 326 of the second member 320, such as a top support block, may be re-engaged with a corresponding end 252, 254 of the attachment strap 250 by rotating the first member 310, such as a bolt support assembly nut, relative to the second member 320 (block 412) and a securing torque can be applied to the strap attachment member 260, such as a bolt, and to the first member 310, such as a bolt support assembly nut (block 414).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A mounting system, comprising:
   a mounting bracket having an attachment opening;
   a strap having an end;
   a pin having a pin opening, the pin insertable into a looped portion of the end of the strap;
   a fastener support assembly including a first member and a second member, the second member comprising a bolt support assembly nut, a first member engagement portion of the second member configured to translate in a direction along a central axis of the second member relative to the first member and responsive to rotation of the first member, the first member comprising a first opening substantially collinear with the central axis of the second member, the second member comprising a second opening substantially collinear with the central axis of the second member; and
   a strap attachment member insertable through the attachment opening, the first opening of the first member, and second opening and the second member, wherein the strap attachment member is configured to engagably couple to the pin via the pin opening.

2. The mounting system of claim 1, wherein the pin opening is a threaded opening and the strap attachment member is a bolt, and wherein the bolt is configured to threadedly engage with the pin via the threaded opening.

3. The mounting system of claim 1, wherein the second member comprises a saddle portion configured to cooperatively secure an end of the strap with the pin.

4. The mounting system of claim 3, wherein the saddle portion of the pin comprises an arcuate portion curved to substantially conform to a portion of a curvature of the pin.

5. The mounting system of claim 1, wherein the second member comprises the first member engagement portion having a threaded exterior, wherein the first opening of the first member comprising a threaded opening, and wherein rotation of the first member engages threads of the threaded opening with threads of the threaded exterior of the second member to translate the second along the central axis relative to the first member.

6. The mounting system of claim 1, wherein the fastener support assembly is configured to selectively apply a load to an interface of the strap attachment member and the pin when the strap attachment member being coupled to the pin via the opening and when the second member is translated relative to the first member.

7. The mounting system of claim 1, wherein the mounting bracket and the strap are configured to secure and exhaust system component.

8. A process for securing an exhaust system component to a mounting system comprising:

inserting a strap attachment member through an attachment opening of a mounting bracket of the mounting system and an opening through a fastener support assembly;
engagably coupling the strap attachment member to a pin inserted through a looped portion of an end of a strap of the mounting bracket;
tightening the strap attachment member relative to the pin; and
engaging a second member of the fastener support assembly to cooperatively secure the end of the strap with the pin by rotating a first member of the fastener support assembly.

9. The process of claim 8, wherein the second member comprises a saddle portion having an arcuate portion curved to substantially conform to a portion of a curvature of the pin.

10. The process of claim 8, wherein the second member comprises a first member engagement portion having a threaded exterior, wherein the first member comprising a threaded opening, wherein rotation of the first member engages threads of the threaded opening with threads of the threaded exterior of the second member to translate the second along the central axis relative to the first member.

11. The process of claim 8 further comprising:
applying a securing torque to the second member of the fastener support assembly and the strap attachment member.

12. The process of claim 8, wherein tightening the strap attachment member relative to the pin comprises tightening the strap attachment member relative to the pin until the strap of the mounting bracket substantially conforms to an exterior profile of the exhaust system component.

13. The process of claim 8, wherein the fastener support assembly is positioned between a portion of the mounting bracket and the pin inserted through the looped portion of the end of the strap.

14. A mounting system, comprising:
a mounting bracket having an attachment opening;
a strap having an end;
a pin having a pin opening, the pin insertable into a looped portion of the end of the strap;
a fastener support assembly including a first member and a second member, a first member engagement portion of the second member configured to translate in a direction along a central axis of the second member relative to the first member and responsive to rotation of the first member, the first member comprising a first opening substantially collinear with the central axis of the second member, the second member comprising a second opening substantially collinear with the central axis of the second member; and
a strap attachment member insertable through the attachment opening, the first opening of the first member, and second opening and the second member, wherein the strap attachment member is configured to engagably couple to the pin via the pin opening,
wherein the pin opening is a threaded opening and the strap attachment member is a bolt, and wherein the bolt is configured to threadedly engage with the pin via the threaded opening.

15. A mounting system, comprising:
a mounting bracket having an attachment opening;
a strap having an end;
a pin having a pin opening, the pin insertable into a looped portion of the end of the strap;
a fastener support assembly including a first member and a second member, a first member engagement portion of the second member configured to translate in a direction along a central axis of the second member relative to the first member and responsive to rotation of the first member, the first member comprising a first opening substantially collinear with the central axis of the second member, the second member comprising a second opening substantially collinear with the central axis of the second member; and
a strap attachment member insertable through the attachment opening, the first opening of the first member, and second opening and the second member, wherein the strap attachment member is configured to engagably couple to the pin via the pin opening,
wherein the second member comprises a saddle portion configured to cooperatively secure an end of the strap with the pin.

16. The mounting system of claim 15, wherein the saddle portion of the pin comprises an arcuate portion curved to substantially conform to a portion of a curvature of the pin.

17. A mounting system, comprising:
a mounting bracket having an attachment opening;
a strap having an end;
a pin having a pin opening, the pin insertable into a looped portion of the end of the strap;
a fastener support assembly including a first member and a second member, a first member engagement portion of the second member configured to translate in a direction along a central axis of the second member relative to the first member and responsive to rotation of the first member, the first member comprising a first opening substantially collinear with the central axis of the second member, the second member comprising a second opening substantially collinear with the central axis of the second member; and
a strap attachment member insertable through the attachment opening, the first opening of the first member, and second opening and the second member, wherein the strap attachment member is configured to engagably couple to the pin via the pin opening,
wherein the second member comprises the first member engagement portion having a threaded exterior, wherein the first opening of the first member comprising a threaded opening, and wherein rotation of the first member engages threads of the threaded opening with threads of the threaded exterior of the second member to translate the second along the central axis relative to the first member.

18. A mounting system, comprising:
a mounting bracket having an attachment opening;
a strap having an end;
a pin having a pin opening, the pin insertable into a looped portion of the end of the strap;
a fastener support assembly including a first member and a second member, a first member engagement portion of the second member configured to translate in a direction along a central axis of the second member relative to the first member and responsive to rotation of the first member, the first member comprising a first opening substantially collinear with the central axis of the second member, the second member comprising a second opening substantially collinear with the central axis of the second member; and
a strap attachment member insertable through the attachment opening, the first opening of the first member, and second opening and the second member, wherein the strap attachment member is configured to engagably couple to the pin via the pin opening, wherein the fastener support assembly is configured to selectively apply a load to an interface of the strap attachment member and the pin when the strap attachment member being coupled to the pin via the opening and when the second member is translated relative to the first member.

* * * * *